United States Patent
Lassota

(10) Patent No.: US 9,052,227 B1
(45) Date of Patent: Jun. 9, 2015

(54) FLUID CONTAINER WITH DISCRETE MODULARIZED MULTIPLE SENSING SYSTEM AND METHOD

(75) Inventor: Michael W. Lassota, Wauconda, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 10 days.

(21) Appl. No.: 13/316,777

(22) Filed: Dec. 12, 2011

Related U.S. Application Data

(60) Provisional application No. 61/422,419, filed on Dec. 13, 2010.

(51) Int. Cl.
G01F 23/00 (2006.01)
G01F 23/26 (2006.01)

(52) U.S. Cl.
CPC .................................. G01F 23/268 (2013.01)

(58) Field of Classification Search
CPC ........... A47J 31/52; A47J 31/54; A47J 31/56; G01N 25/50; G01L 5/14; G01L 23/00; G01F 23/24; G01F 23/242; G01F 23/266; G01F 23/263; G01F 23/268; G01F 23/265; G01F 25/0061
USPC .......... 73/35.16, 812, 849, 862.325, 862.632, 73/152.55, 170.01, 170.08, 302, 504.11, 73/304 R, 304 C, 290 R, 291, 292, 295
See application file for complete search history.

(56) References Cited

U.S. PATENT DOCUMENTS

| | | | | |
|---|---|---|---|---|
| 4,671,110 A * | 6/1987 | de Kock | ........................ | 73/323 |
| 5,280,844 A * | 1/1994 | Kaufman et al. | ............ | 220/710 |
| 6,129,265 A * | 10/2000 | Perryman et al. | .......... | 229/103.1 |
| 6,158,227 A * | 12/2000 | Seeley | ............... | 62/56 |
| 6,741,180 B2 * | 5/2004 | Lassota | ........................ | 340/622 |
| 7,506,576 B1 * | 3/2009 | Lassota | ........................ | 99/280 |
| 7,520,659 B2 * | 4/2009 | Wulf et al. | ................... | 366/198 |
| 7,798,373 B1 * | 9/2010 | Wroblewski et al. | ......... | 222/209 |
| 8,387,455 B1 * | 3/2013 | Kaminski | .................. | 73/304 C |
| 8,429,965 B2 * | 4/2013 | Radhakrishnan et al. | .. | 73/304 C |
| 8,464,584 B2 * | 6/2013 | Lassota et al. | ............. | 73/304 R |
| 2007/0204930 A1 * | 9/2007 | Phallen et al. | .................. | 141/83 |

* cited by examiner

*Primary Examiner* — Peter Macchiarolo
*Assistant Examiner* — Mohammed Keramet-Amircola
(74) *Attorney, Agent, or Firm* — James W. Potthast; Potthast & Associates

(57) ABSTRACT

A fluid container (10) with a hollow body (12) for containing a fluid such as beverage (22) with a surrounding sidewall (16) extending between a top (18) and a bottom (20) provided with a flexible sensing strip (14) with discrete modular fluid characteristic sensing elements mounted to the sidewall (16) of a hollow body (12) for sensing an actual physical parameter of the fluid, a control module (24) and a detachable interface (26) between the sensing strip (14) and the control module (24) to enable sensing signals to be passed from the sensing strip (14) to the control module (24) has a detachable interface enabling tool-less disconnection of the control module (24) from the sensing strip (14) to enable replacement with another control module for repair or servicing. The individual sensing elements may also be toolessly disconnected from the strip for replacement or repair.

24 Claims, 2 Drawing Sheets

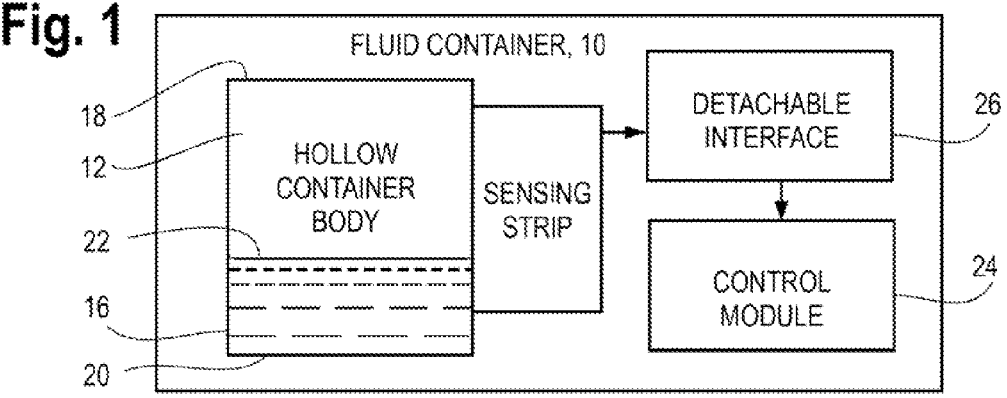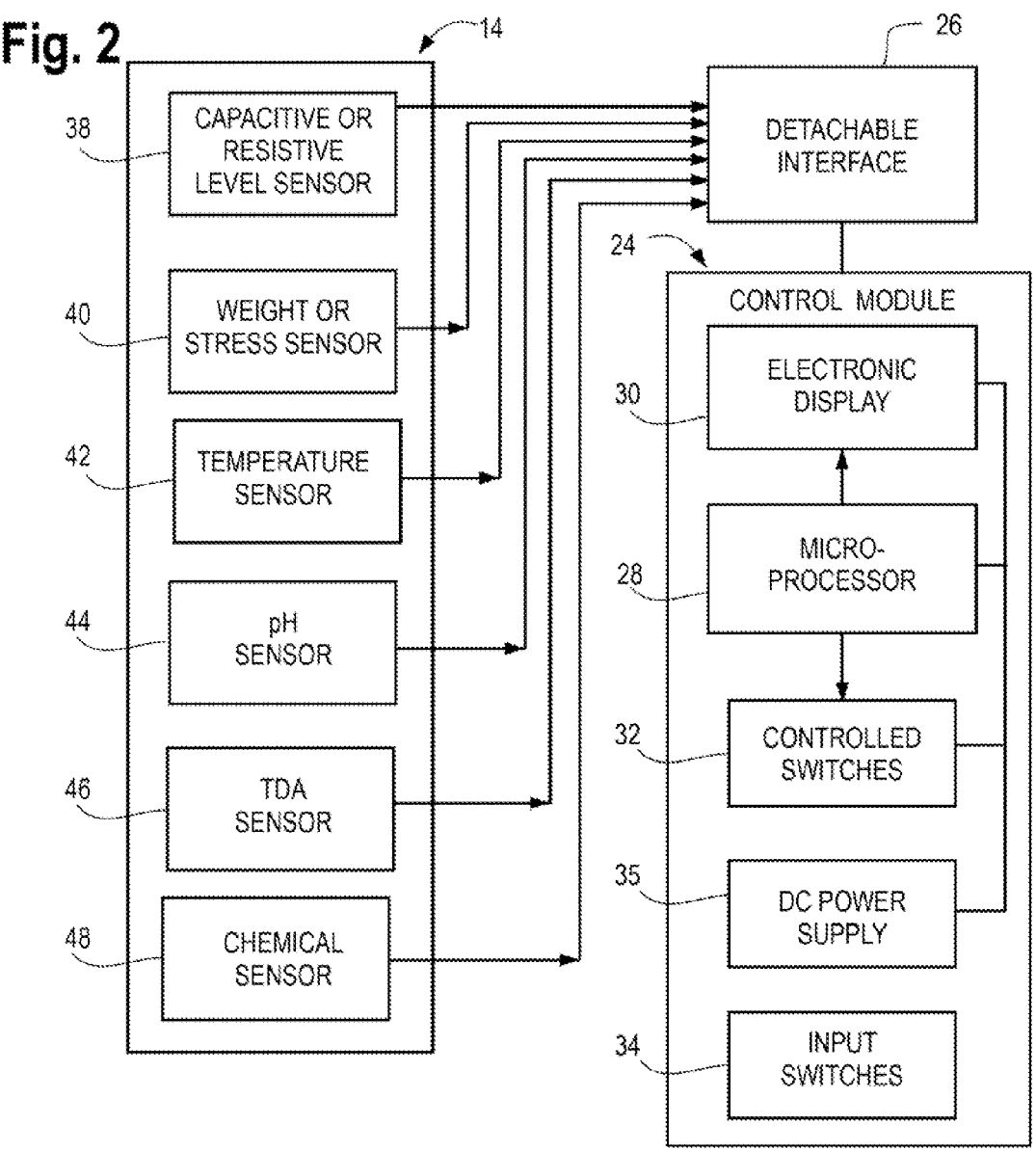

FLUID CONTAINER WITH DISCRETE MODULARIZED MULTIPLE SENSING SYSTEM AND METHOD

CROSS REFERENCE TO RELATED APPLICATION

This application claims the benefit under 35 U.S.C. 119(e) of provisional patent application 61/422,419 of the present inventor, filed Dec. 13, 2010, and entitled "Fluid Container with Discrete Modularized Multiple Sensing System and Method", which is hereby incorporated by reference.

BACKGROUND OF THE INVENTION

1. Field of the Invention

This invention generally relates to fluid containers, and more particularly, to opaque dispensers with means for displaying physical characteristics of the beverage within the container.

2. Discussion of the Prior Art

Commercial fluid containers of the type having a hollow, insulated body made of stainless steel or other opaque materials with a closable top for direct receipt of beverage from a beverage brewer and a bottom supported above a support surface with a faucet for serving beverage from the hollow body into individual serving cups or the like are know. Because the hollow body is made of opaque materials the quantity, or level, of the beverage can not be ascertained simply by viewing the outside of the dispenser, such as is possible with transparent glass carafes and the like.

In the past, so-called "sight tubes" mounted on the outside of the dispenser but in fluid communication with the interior were used to provide a visual indication of the level of the beverage within the hollow body. However, these glass tubes were fragile and would become stained over time and presented cleaning and hygienic problems. In order to avoid these problems, it is known to provide an electronic level sensing circuit with a probe within the dispenser body and a visual electronic display mounted to the exterior of the body and responsive to the probe to provide an indication of the beverage level. Such a dispenser is shown and described in U.S. Pat. No. 6,741,180 issued May 25, 2004 to Zbignicw G. Lassota for an invention in "Beverage Dispensing Urn with Electronic Display", which is hereby incorporated by reference. In the probe used in this dispenser, conductive lands on the exterior of a probe body are exposed to the beverage. This resistance varies depending upon the level of the beverage and is measured to determine the quantity of beverage.

In U.S. Pat. No. 7,798,373 issued Sep. 21, 2010 to Zbigniew G. Lassota for an invention in an "Airpot Fluid Container with Flow Thorough Lid and Display and Method", hereby incorporated by reference, the probe for the display is formed by a series of capacitors at different levels. The capacitance that varies depending upon whether the capacitor is below or above the surface of the beverage. The capacitive plates do not have direct contact with the beverage but sense the beverage indirectly due to changes in dielectric constant.

In order to produce these level sensing probes, it is necessary to provide leads from each of the lands, or sensing elements, forming either a capacitor or a resistor within the dispenser boy with a sensing circuit located outside of the dispenser body and to hold the sensing element in a fixed spatial relationship relative to each other and to the bottom of the dispenser body. In the aforementioned patents, the sensing elements are directly mounted to a hollow down tube that extends downwardly from a funnel at the top of the dispenser to convey freshly brewed beverage to the bottom of the dispenser. The funnel is part of a funnel assembly within which the display circuitry is protectively mounted and to which the beverage level display is mounted.

In U.S. patent application Ser. No. 13/193,091 of Marek K. Kwiatkowski and Andrzej Kaminski, filed Jul. 28, 2011, for an invention entitled "Hot Fluid Container with Level Sensing Probe and Method of Making Same", methods are shown to make a strip with either resistive or capacitive level sensing capabilities. These strips are mounted to down tubes of an integrated funnel assembly which include a controller and a display fixedly connected together with the sensing strip such that they could not be easily separated or disassembled. These strips are capable of sensing only levels and not other characteristics of the beverage.

These inventions perform satisfactorily but do not enable or facilitate an easy separation of control circuitry from sensing strips. Accordingly, if repair is required, the entire dispenser must be removed from service which results in loss time and travel as well the need to maintain an inventory of loaner dispensers for use when the dispenser being repaired is absent.

SUMMARY OF THE INVENTION

It is therefore an object of the present invention to provide a physical sensing system for a fluid container and method of sensing that overcomes or reduces the problems with known such systems by making all the parts of the sensing system modular and thereby adaptable and useful for diverse applications. In particular, the invention is well adapted to sensing fluid level and characteristic with a flexible sensing strip located either on the inside or outside of an opaque container.

This object is achieved in part by providing a fluid container, with a hollow body for containing a beverage with a surrounding sidewall extending between a top and a bottom; a flexible sensing strip mounted to the hollow body having discrete modular elements for sensing an actual physical parameter of the beverage; a control module; and a detachable interface between the sensing strip and the control module to enable sensing signals to be passed from the sensing strip to the control module, said detachable interface enabling toolless separation and disconnection of the control module from the sensing strip to enable replacement with another control module for repair, recharging, replenishing, downloading sensing data, sharing, upgrades, receipt of service packages or other repair or servicing.

Preferably, the sidewall has an interior surface and an exterior surface and the sensing strip is mounted to the exterior surface. In such case, the sensing strip has at least one, or any combination of, (a) capacitive level sensor and (b) a weight sensor and (c) a temperature sensor.

In another embodiment the sidewall has an interior surface and the sensing strip is mounted to one of (a) the interior surface, and (b) a sensor base member removably mounted within the hollow body. In such case, the sensing strip has at least one of, or any combination of (a) pH sensor, (b) temperature sensor, (c) a TDS sensor, and (d) a specific chemical sensor, (e) a weight or strain sensor and (e) a capacitive level sensor or a resistive level sensor.

Preferably, the detachable interface includes at least one of (a) a mating electrical connector, (b) a detachable plug, (c) a detachable lock and pawls connector, (d) an airwave signal generator.

If the sidewall is polymeric, the sensing strip may be molded into the sidewall. Alternatively, the sensing strip is either adhered to the sidewall or mechanically fastened to the sidewall.

The control module preferably includes a display for displaying information obtained from the sensing strip as well as means for controlling other circuitry.

The object of the invention is also acquired in part by providing a method of sensing fluid in a fluid container having a hollow body for containing a beverage with a surrounding sidewall extending between a top and a bottom, by performing the steps of sensing an actual physical parameter of the fluid with a flexible sensing strip mounted to the hollow body; a control module; passing sensing signals from the sensing strip through a tool-less detachable interface between the sensing strip and the control module; separating and disconnecting the control module from the sensing strip; and replacing the one control module with another control module to enable repair, recharging, replenishing, downloading sensing data, sharing, upgrades, receipt of service packages or other repair or servicing of the one control module.

BRIEF DESCRIPTION OF THE DRAWINGS

The foregoing advantages, features and objects will be shown others will be made apparent from the detailed description below that is given with reference to the several figures of the drawing, in which:

FIG. 1 is a functional block diagram of the fluid container of the present invention;

FIG. 2 is another functional block diagram of the fluid container similar to that of FIG. 1 but showing features in greater detail.

DETAILED DESCRIPTION

Figure 3:
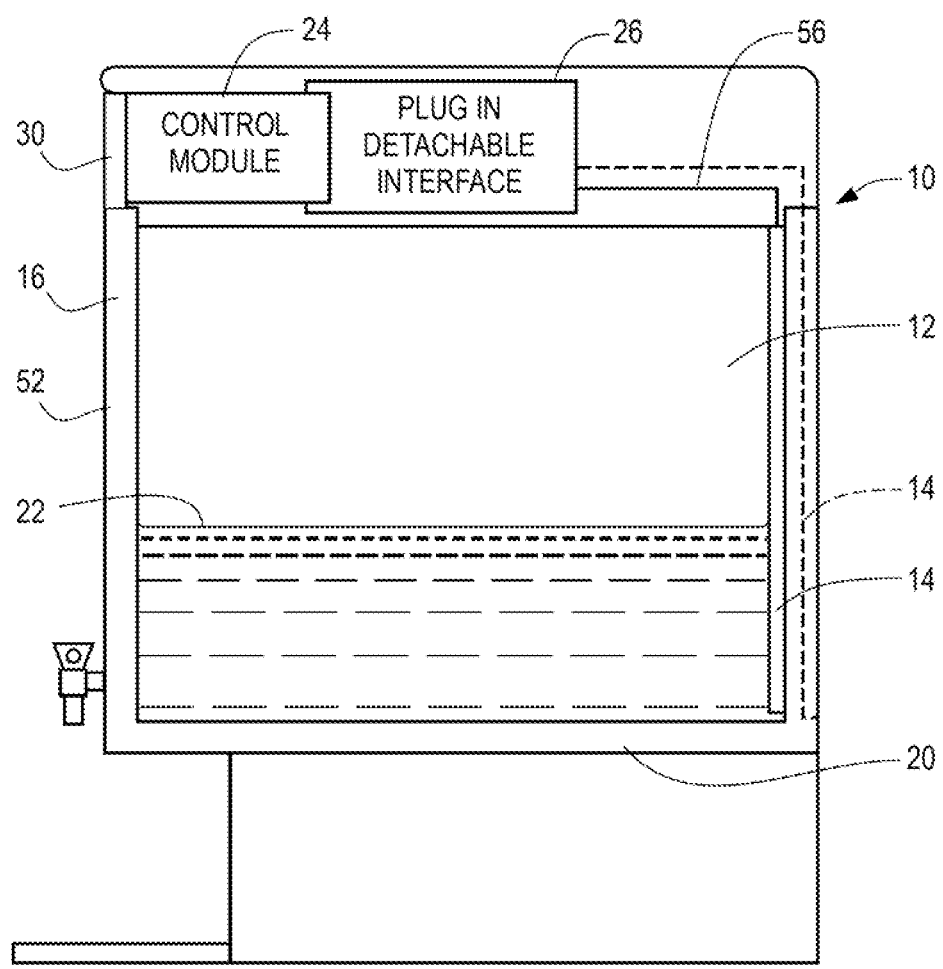
FIG. 3 is a schematic illustration of the invention as employed with a beverage dispenser.

Referring to FIG. 1, the fluid container assembly with modularized multiple sensing system, or fluid container, 10 of the present invention has a container body 12 with a flexible multiple sensing strip, or sensing strip, 14. The container 10 is preferable a beverage container such as the insulated dispensers shown in U.S. patent application Ser. No. 12/731,436 of Andrzej Kaminski, filed Mar. 25, 2010 for an invention entitled "Beverage Dispenser with Capacitive level Sensor and Display", U.S. patent application Ser. No. 13/193,091 of Marek K. Kwiatkowski and Andrzej Kaminski, filed Jul. 28, 2011, for an invention entitled "Hot Fluid Container with Level Sensing Probe and Method of Making Same", and U.S. Pat. No. 6,741,180 issued May 25, 2004 to Zbigniew G. Lassota for an invention in "Beverage Dispensing Urn with Electronic Display", all of which are hereby incorporated by reference. However, the fluid container could be used for containing any fluid other than beverages.

Reference should be made to these patents and the patents noted in the background above, all of which are hereby incorporated by reference, for any details with respect to the construction of the dispenser. The sensing strip is preferably constructed in accordance with the invention shown and described in U.S. patent application Ser. No. 13/193,091 of Marek K. Kwiatkowski and Andrzej Kaminski, filed Jul. 28, 2011, for an invention entitled "Hot Fluid Container with Level Sensing Probe and Method of Making Same", which is hereby incorporated by reference.

In accordance with the present invention, the hollow body 12 has a surrounding sidewall 16 extending between a top 18 and a bottom 20. The flexible sensing strip 14 is mounted to the hollow body 12 in such a way as needed for sensing one or more actual physical parameters of a beverage or other fluid 22 within the hollow container body 12. The fluid container 10 also includes a control module 24 which is releasable interfaced with the flexible sensing, strip 14 through means of a detachable interface 26. The detachable interface 26 between the sensing strip 14 and the control module 24 enables sensing signals to be passed from the sensing strip 14 to the control module 24. In accordance with the invention, the detachable interface 26 enables tool-less separation and disconnection of the control module 24 from the sensing strip 14 to enable replacement with another control module (not shown) for repair, recharging, replenishing, downloading sensing data, sharing, upgrades, receipt of service packages or other repair or servicing.

Referring to FIG. 2, the control module 24 preferably includes a microprocessor 28, an electronic display 30, such as formed by a matrix of light emitting diodes, or a LCD, controlled switches 32 with outputs for connection with and control of other operations, such as heating, remotely displaying, alarming and the like, such as presence-absence adjustments and mixed ingredient adjustments. The control module 24 also includes manual input switches 34 to enable programming, downloading, uploading, and other communications needed to use the control module 24 and the display 30. Alternatively, or additionally, the display has touch-sensitive areas, or soft keys, through which entries may be made to the microprocessor 28. The control module also carries what interfacing hardware or software is needed to receive data signals from the flexible strip 14. The control module may also carry its own DC power supply 35, such as a rechargeable battery.

Still referring to FIG. 2, the sensing strip 14 has at least one of, or any combination of: a capacitive or resistive level sensor 38, a weight, or strain, sensor 40, a temperature sensor 42, a pH sensor 44, a total dissolved solids, (or TDS sensor) 46, and a specific chemical sensor 48, such as a salt detector, depending upon the location of the sensing strip. If the sensing strip 14 is mounted to the outside of the sidewall 22, then those sensors which require direct physical contact with the fluid 22 inside the hollow container body 20 to function, all but the weight sensor, the temperature and the capacitive level sensor, are not included on the sensing strip 14. If the sensing strip is mounted within the hollow container body in contact with the liquid or other fluid 22, the either a resistive or capacitive level sensor may be used, such as shown in the U.S. patent and the provisional patent application, noted above. On the other hand, if the sensing strip 14 is mounted on the outside of the hollow container body 12, then only the capacitive level sensor may be used.

The detachable interface 26 includes at least one of (a) a mating electrical connector, (b) a detachable plug, (c) a detachable lock and pawls connector, or (d) an airwave signal generator. In the case of an airwave generator, the detachable interface 26 has an airwave signal receiver that receives contact electrical data input signals and converts them to radio waves that are remotely received by a receiver associated with the control module 24.

Referring to FIG. 3, when contained within the hollow container body 12, the sensing strip 14, is preferably mounted to in an upright position to an inner surface 50 of the sidewall 16. Alternatively, the sensing strip 14 and mounted to an elongate a sensor base member (not shown) removably mounted within the hollow body 12, such as the down tube of a funnel assembly that extends from adjacent the top 18 to adjacent the bottom 20, as shown in the aforementioned provisional patent application When the sensing strip 24 is not contained within the hollow container body 12, then the hollow container body must be made of a non-metallic material to enable the capacitive level sensor 38 to respond to the changing level of the fluid within the container. In the case, of the sensing strip 14 being mounted to an outer surface 52 of the sidewall 16, preferably, the sidewall 16 is made of a polymeric or other moldable material, and the flexible strip 14 is molded into the sidewall 16, as shown in broken line in FIG. 3. In the case of polymeric moldable material being used, then the flexible strip may also be molded into the inside surface 50. Regardless of the material from which the sidewall 16 is made, the flexible strip 14 may be adhered to the sidewall or mechanically fastened to the sidewall, as described in the aforementioned patent application Ser. No. 13/193,091 filed Jul. 28, 2011.

As shown in FIG. 3, the control module 24 and the detachable interface 26 may be protectively mounted within a hollow cover 54 that is removable mounted to the hollow container body 12. The connection end of the sensing strip 14 is brought to the top of the hollow container body 12 where it is releasably interfaced with the control module through mating connectors 56 of the interface 26. When the cover is removed, the control module is automatically disconnected from sensing strip 14, and another identical cover may be substituted that will automatically make connection with the sensing strip 14 when the cover 54 is fully mounted in place. Alternatively, the display and control module may simply be slid out of the cover 54 through the hole provided for the display 30 and another module substituted in its place while leaving the cover 54 in place. The display may be a standard LCD or LED display. Additionally or alternatively, the output information could be passed via a USB connection or wifi to a computer or the like.

Thus in accordance with the invention, a method of sensing fluid in a fluid container having a hollow body for containing a fluid with a surrounding sidewall extending between a top and a bottom, is provided by performing the steps of sensing an actual physical parameter of the fluid with a flexible sensing strip mounted to the hollow body; passing sensing signals from the sensing strip through a tool-less detachable interface between the sensing strip and the control module; separating and disconnecting the control module from the sensing strip; and replacing the one control module with another control module and repairing, recharging, replenishing, downloading sensing data, sharing, upgrades, receipt of service packages or performing other repair or servicing of the one control module. Tool-less detachable is intended to mean that the module may simply by removed manually or replaced without the need for any tools although it may be necessary to unlock the module from the container if locking is used to prevent inadvertent or unauthorized removal.

While a particular embodiment has been disclosed in detail, it should be appreciated that many variations may be made without departing from the spirit and scope of the invention. For example, a sensor strip may be provided on the outside of a container with bands of temperature sensors that detect liquid levels inside the container by sensing the difference in temperatures above and beneath the level of the liquid, such as with a hot water supply tank.

The invention claimed is:

1. An insulated beverage dispenser with a hollow, opaque body for independently bolding a quantity of beverage composed of a plurality of individual serving cups of beverage to be dispensed, comprising:

a hollow body for containing a beverage with a surrounding sidewall extending between a closable open top and a closed bottom and having an interior surface and an exterior surface;

a flexible sensing strip fixedly mounted to one of the exterior surface and the interior surface of the surrounding sidewall of the hollow body for sensing at least one actual physical parameter of the beverage including the quantity of the beverage within the hollow body;

a control module mounted to the hollow body including a display for visually displaying information obtained from the sensing strip; and a detachable interface between the sensing strip and the control module to enable sensing signals to be passed from the sensing strip to the control module, said detachable interface enabling tool-less separation and disconnection of the control module from the sensing strip to enable replacement with another control module for repair, recharging, replenishing, downloading sensing data, sharing, upgrades, receipt of service packages or other repair or servicing.

2. The beverage dispenser of claim 1 in which the sensing strip is mounted to the exterior surface.

3. The beverage dispenser of claim 2 in which the sensing strip has at least one weight sensor.

4. The beverage dispenser of claim 1 in which the flexible sensing strip is mounted to the interior surface of the hollow body.

5. The beverage dispenser of claim 4 in which the sensing strip has at least one of or any combination of (a) pH sensor, b) a TDS sensor, (c) a specific chemical sensor, and (d) a resistive level sensor.

6. The beverage dispenser of claim 1 in which the detachable interface includes at least one of (a) a mating electrical connector, (b) a detachable plug, (c) a detachable lock and pawls connector and (d) an airwave signal generator.

7. The beverage dispenser of claim 1 in which the sidewall is polymeric and the flexible strip is one of (1) molded into the sidewall, (b) adhered to the sidewall with an adhesive, and (c) permanently mechanically fastened to the sidewall.

8. The beverage dispenser of claim 1 in which the control module includes a display for visually displaying information obtained from the sensing strip.

9. The beverage dispenser of claim 1 in which the control module includes means for controlling other circuitry.

10. For use with an insulated beverage dispenser with a hollow, opaque body having a surrounding sidewall with an interior and exterior surface and extending between a closable top and a closed bottom for independently holding a plurality of individual serving cups of beverage to be dispensed, a method of monitoring the beverage within the hollow body, comprising the steps of:

sensing at least one actual physical parameter of the beverage including a the quantity of beverage within the hollow body with a flexible sensing strip mounted to one of the interior surface and the exterior surface of the hollow body;

passing sensing, signals from the sensing strip through a tool-less detachable interface between the sensing strip and a control module with a display mounted to hollow body, said control module;

toolessly separating and disconnecting the control module from the sensing strip; and replacing the one control module with another control module to enable repair, recharging, replenishing, downloading sensing data, sharing, upgrades, receipt of service packages or other repair or servicing of the one control module.

11. The method of claim 10 in which the sensing strip is mounted to the exterior surface of the hollow body.

12. The method of claim 11 in which the flexible sensing strip has a weight sensor.

13. The method of claim 10 in which the flexible sensing strip is mounted to the interior surface of the hollow body.

14. The method of claim 13 including the step of sensing with the sensing strip at least one of, or any combination of (a) pH, (b) as TDS, and (c) a specific chemical sensor and (d) a resistively sensed level.

15. The method of claim 10 including the step of interfacing the control module with the sensing strip by at least one of (a) attaching with mating electrical connector, (b) attaching with a detachable plug, (c) attaching with a detachable lock and pawls connector and (d) generating airwave signals.

16. The method of claim 10 in which the sidewall is polymeric and including the step of molding the sensing strip into the sidewall, (b) adhered the sensing strip to the sidewall with an adhesive, and (c) permanently mechanically fastening the sensing strip to the sidewall.

17. The method of claim 10 including the step of displaying information obtained from the sensing strip with a display of the control module.

18. The method of claim 10 including the step of controlling other circuitry with the control module.

19. An insulated beverage dispenser for independently holding a quantity of beverage composed of a plurality of individual serving cups of beverage to be dispensed, comprising:
- an insulated hollow body for containing a beverage with a surrounding sidewall having an interior surface and an exterior surface extending between a closable open top and a closed bottom;
- a flexible sensing strip fixedly attached to one of the interior surface and the exterior surface for sensing at least one actual physical parameter of the beverage including the quantity of the beverage within the hollow body;
- a control module with a display mounted to the hollow body;
- a detachable interface between the sensing strip and the control module to enable sensing signals to be passed from the flexible sensing strip to the control module, said detachable interface enabling tool-less separation and disconnection of the control module from the sensing strip to enable replacement with another control module for repair, recharging, replenishing, downloading sensing data, sharing, upgrades, receipt of service packages or other repair or servicing; and
- a hollow cover removably mounted to the hollow body to close the closable top, said control module and the detachable interface being protectively mounted to the hollow cover.

20. The insulated beverage dispenser of claim 19 in which a connection end of the flexible sensing strip is releasably interface with the control module within the hollow cover by means of mating mechanical connectors which automatically disconnect when the hollow cover is removed from the closable top.

21. The insulated beverage dispenser of claim 20 in which the mating mechanical connectors automatically make connection with each other when the hollow cover is fully mounted to the hollow body to close the closable top.

22. The method of claim 19 including the step of protectively mounting the control module and the detachable interface within a hollow cover removably mounted to the hollow body to close the closable top.

23. The method of claim 22 in which the step of disconnecting includes the step of automatically disconnecting mating mechanical connectors which releasably interconnect a connection end of the flexible sensing strip with the control module within the hollow cover when the hollow cover is removed from the closable top.

24. The method of claim 23 in which the step of replacing includes the step of automatically interconnecting the one mating mechanical connectors carried at the connection end of the flexible sensing strip with another mating mechanical connector carried by another hollow cover within which the other control module is carried when the hollow cover is fully mounted to the hollow body to close the closable top.

* * * * *